E. S. BURWELL.
HORSE BLANKET.
APPLICATION FILED FEB. 6, 1908.
939,662.
Patented Nov. 9, 1909.
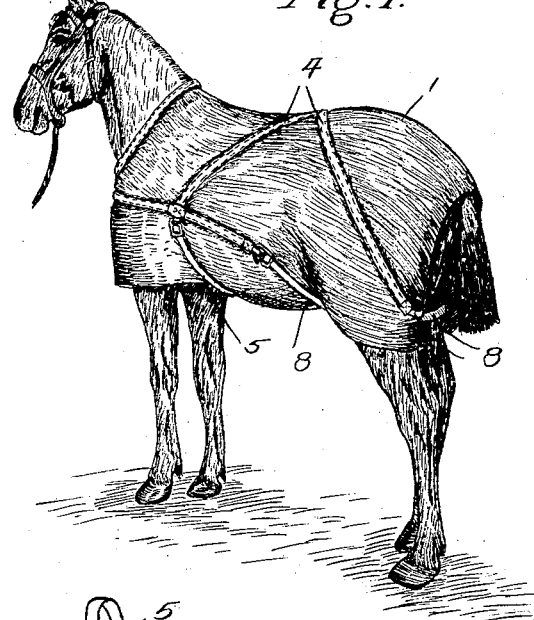
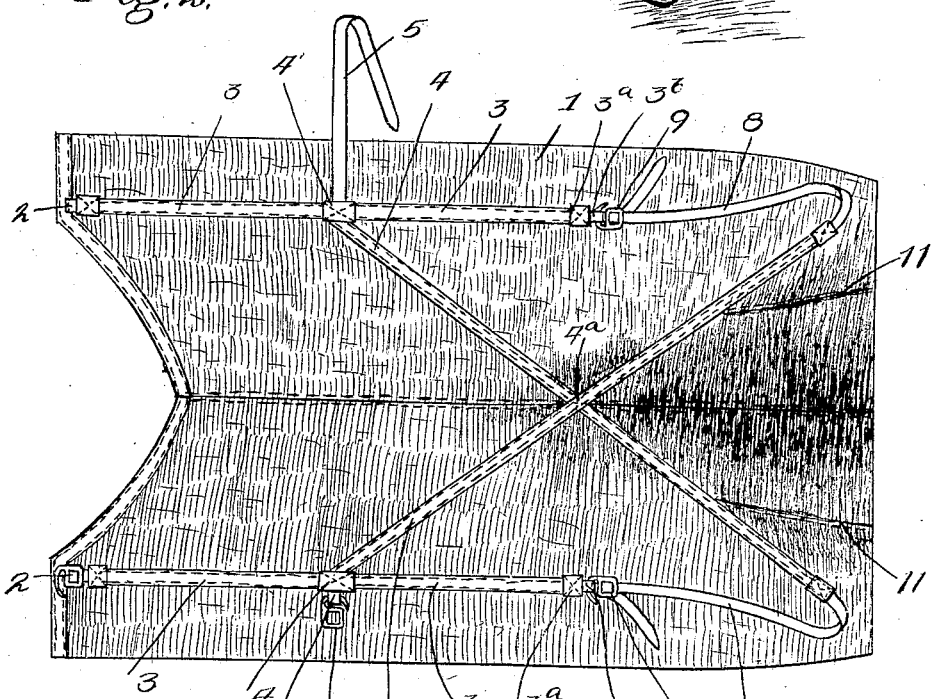
Witnesses
V. G. Brann
George E. Edelin
Inventor
Earl S. Burwell
By H. H. Bliss
Attorney

_UNITED STATES PATENT OFFICE._

EARL S. BURWELL, OF MADISON, WISCONSIN.

HORSE-BLANKET.

939,662.  Specification of Letters Patent.  Patented Nov. 9, 1909.

Application filed February 6, 1908. Serial No. 414,629.

_To all whom it may concern:_

Be it known that I, EARL S. BURWELL, a citizen of the United States, residing at Madison, in the county of Dane and State of Wisconsin, have invented certain new and useful Improvements in Horse-Blankets, of which the following is a specification, reference being had therein to the accompanying drawing.

This device relates to an improvement in devices for attaching blankets to animals, it being adapted for use in connection with any style of horse blanket.

Figure 1 shows in side elevation a blanket having my improved attachment, the blanket being shown in position on a horse. Fig. 2 is a perspective view of a blanket provided with one of my improved attachments.

In the drawings, 1 represents the blanket as an entirety, 2 the fastening device for the front end thereof. This fastening device may be made in any well-known manner.

3, 3, indicate longitudinal strips of webbing of any suitable material arranged on either side of the blanket and extending from the fastening devices 2, 2, rearwardly toward the lower edge of each side of the blanket and terminating, as shown, at points 3ª, 3ª, which are in front of the hind legs of the horse when the blanket is in position.

4, 4, are cross strips of webbing of any suitable material, each of which extends from a point 4′ along one of the straps 3 and near the front end thereof, up and rearwardly over the back of the horse crossing the corresponding strip at 4ª and then downwardly and rearwardly on the other side, terminating just above the lower rear corner of the blanket. The rear end of each of the straps 3 is provided with a loop 3ᵇ which is held fixedly in position relatively to the blanket.

A strip of webbing 5, extends from one of the points 4′, 4′, directly downward to the lower edge of the blanket, and is of sufficient length to be drawn under the horse and up on the other side, its outer end being provided with a fastening and take-up device 6 adapted to engage the loop 7 secured to the blanket at the other of the two points 4′.

8, 8 are strips of webbing adapted to connect the strips 4, 4, with the loops 3ᵇ, 3ᵇ, and are to be carried between the hind legs of the horse, as indicated. These straps 8, 8, are likewise provided with fastening and take-up devices 9, 9, adapted to engage the loops 3ᵇ.

Wedge shaped pieces are taken out of the rear edge of the blanket on either side of the center line as indicated at 11, 11, to cause the blanket to conform to the shape of the body of the horse.

It will be noted that I have devised a very simple and efficient form of blanket attachment, all parts of which may be readily and quickly applied to any of the blankets now in use, and thoroughly adapted to hold all parts of the blanket in proper position on the horse.

The side strips 3, 3, hold the blanket smoothly against the horse's sides, and the strips 4, 4, and strap 5 furnish a continuous reinforcement over the back and under the body of the horse, so located as to hold the blanket smoothly to position on the horse. The connecting straps passing around the rear legs of the horse and the front fastening devices 2 serve to prevent the blanket from working off the horse.

While I have referred to this improved blanket as applied to a horse, it will be understood that it is equally serviceable for other quadrupeds.

What I claim is:

1. The combination with an animal blanket, of two longitudinal strips secured thereto, each extending rearwardly in straight lines from one of two points respectively near the side edges of the blanket and approximately midway between the ends of the blanket, two fastening devices attached to the forward end of the blanket near its side edges respectively and in alinement with the said strips, two cross strips secured to the blanket, each extending from a point which is in the longitudinal central line of the blanket and to the rear of said first mentioned points backward and rearward, and two connecting straps each adapted to connect the rear end of one of the cross strips with the rear end of one of the longitudinal strips and to be passed around the rear leg of the horse.

2. The combination with an animal blanket, of the two fastening devices attached to its forward edge and near its side edges respectively, the longitudinal strips secured to the blanket, each extending rearwardly from one of two points which are near the side edges respectively of the blanket and approximately midway between the ends of the blanket, two cross strips secured to the blanket, each extending upward and rearward from one of the said points and then downward and rearward on the other side of the blanket, two connecting straps each adapted to be passed around one of the hind legs of the horse and to connect the rear end of one of the longitudinal strips with the rear end of one of the cross strips.

3. The combination with an animal blanket, of the fastening devices attached to the forward end of the blanket and near its side edges respectively adapted to secure the blanket about the neck of the horse, two longitudinal strips secured to the blanket, each extending rearward from one of the fastening devices in a straight line and approximately parallel to the edge of the blanket, two cross strips secured to the blanket, each extending diagonally upward and rearward from a point on one of the longitudinal strips and then diagonally downward and rearward on the other side of the blanket, two connecting straps, each adapted to connect the rear end of one of the longitudinal strips with the rear end of the adjacent cross strip and the connecting strap secured at one end at one of the said points and designed to be detachably secured at its other end to the other said point at which the cross strips meet the longitudinal strips.

4. The combination with an animal blanket, of two fastening devices adapted to secure the blanket about the neck of the horse, two longitudinal strips secured to the blanket, one near each side of the blanket, a strap adapted to pass under the horse and to secure the blanket about the body of the horse, cross strips, each running from a point near one side edge of the blanket and near the front edge of the blanket diagonally across the blanket to a point near the opposite rear corner, and straps, each adapted to be passed about one of the hind legs of the horse and to connect the rear end of one of the cross straps with the rear end of an adjacent longitudinal strap.

In testimony whereof I affix my signature, in presence of two witnesses.

EARL S. BURWELL.

Witnesses:
 FRED I. CLAPP,
 J. L. DAVISON.